United States Patent
Liu et al.

(10) Patent No.: US 8,562,239 B1
(45) Date of Patent: Oct. 22, 2013

(54) JOINT WITH A PROTRUSION ROD FOR FURNITURE

(76) Inventors: Min-Sheng Liu, Guangdong (CN); Jie Liu, Guangdong (CN); Lei Cao, Guangdong (CN); Wei-Ye Cao, Guangdong (CN)

(*) Notice: Subject to any disclaimer, the term of this patent is extended or adjusted under 35 U.S.C. 154(b) by 0 days.

(21) Appl. No.: 13/454,161

(22) Filed: Apr. 24, 2012

(51) Int. Cl.
*F16B 12/26* (2006.01)

(52) U.S. Cl.
USPC .................................. 403/252; 403/DIG. 13

(58) Field of Classification Search
USPC ............... 403/231, 252–255, 238, 239, 403, 403/DIG. 11–DIG. 13
See application file for complete search history.

(56) References Cited

U.S. PATENT DOCUMENTS

| | | | | |
|---|---|---|---|---|
| 4,160,610 A | * | 7/1979 | Austin-Brown et al. | 403/231 |
| 4,208,850 A | * | 6/1980 | Collier | 403/12 |
| 4,353,663 A | * | 10/1982 | Glickman | 403/230 |
| 4,553,873 A | * | 11/1985 | Salice | 403/245 |
| 4,616,953 A | * | 10/1986 | Gomes | 403/292 |
| 5,048,995 A | * | 9/1991 | Beaulieu | 403/264 |
| 5,403,109 A | * | 4/1995 | Johnson et al. | 403/231 |
| 5,567,081 A | * | 10/1996 | Vallance | 403/292 |
| 5,895,103 A | * | 4/1999 | Huber | 312/348.4 |
| 5,902,083 A | * | 5/1999 | Hwang | 411/48 |
| 6,048,147 A | * | 4/2000 | Arisaka et al. | 411/48 |
| 6,148,569 A | * | 11/2000 | Giovannetti | 52/127.11 |
| 6,540,461 B1 | * | 4/2003 | Hawang | 411/48 |
| 6,547,477 B1 | * | 4/2003 | Huber et al. | 403/322.4 |
| 6,939,075 B2 | * | 9/2005 | Walz | 403/231 |
| 7,341,395 B2 | * | 3/2008 | Tseng | 403/296 |
| 7,413,367 B2 | * | 8/2008 | Hawang | 403/297 |

FOREIGN PATENT DOCUMENTS

DE 3610601 A1 * 10/1987
GB 2033043 A * 5/1980

* cited by examiner

*Primary Examiner* — Joshua Kennedy
(74) *Attorney, Agent, or Firm* — Alan Kamrath; Kamrath IP Lawfirm, P.A.

(57) ABSTRACT

A joint with a protrusion rod has a male buckle and a female buckle engaged with each other. The male buckled has a hollow insertion stub with multiple expansion slots and has a receiving hole to movably receive a protrusion rod. A distal end of the protrusion rod is movably engaged with the insertion stub. The protrusion rod has a locking plate and multiple fins correspondingly engaged with the expansion slots when the protrusion rod is wedged into the insertion stub. By having the above structure, difficulty of disengagement of the protrusion rod from the insertion stub is significantly increased to prevent the disengagement of the male buckle and the female buckle. Thus, the joint has increased combination strength and is excellent in utility.

13 Claims, 8 Drawing Sheets

JOINT WITH A PROTRUSION ROD FOR FURNITURE

BACKGROUND OF THE INVENTION

1. Field of the Invention

The present invention relates to a joint and, more particularly, to a joint having a protrusion rod for a furniture combination.

2. Description of Related Art

Conventional furniture is assembled by immovable joints between parts which are easily damaged during transportation or moving and occupy huge space. Therefore, the transportation cost is correspondingly increased. Currently, assembled furniture is published to the market and is disassembled into parts for packing. By transporting the assembled furniture in pieces, the occupied space and transportation cost are significantly reduced, and damage caused by bumping during transportation is also avoided. The assembled furniture is mostly detachably combined by means of screws and nuts or screws and metal hinges. The adoption of such means has drawbacks such as that the parts of furniture are drilled to make holes at connection places. The holes enlarge or deform after reassembling the parts several times, and, thus, the furniture has poor stability and is easily damaged. Moreover, gaps of the conventional assembled furniture are large, making the appearance not neat.

The conventional joint has a male buckle and a female buckle. The male buckle has a Z-shaped protrusion rod engaged with a base. The base has an insertion part formed at one end surface integrally, and the insertion part has expansion slots. The interior of the insertion part abutting to the base has a recess. The protrusion rod is movably mounted on the base and has its upper surface flush with an upper end surface of the base. A lower end of the protrusion rod is received inside the recess of the insertion part and is movable in a limited range. The female buckle is a cylinder with a receiving hole and has stops formed inside the receiving hole. When the insertion part of the male buckle inserts into the receiving hole of the female buckle, the protrusion rod locates in position. Although the foregoing structure allows the parts of the furniture to be assembled, the assembled furniture is easily deformed or can even break apart when users load weight or pressure on the furniture and the protrusion rod disengages from the receiving hole. Stability and safety of the disassembled furniture with the conventional joints are insufficient.

SUMMARY OF THE INVENTION

A main objective of the present invention is to provide a joint with a protrusion rod for furniture which is stable and has an enhanced combination efficiency.

To achieve the foregoing objective, the joint with a protrusion rod comprises a male buckle and a female buckle engaged with each other. The male buckle has a hollow insertion stub with multiple expansion slots and has a receiving hole. A protrusion rod is movably received inside the receiving hole of the male buckle and has a locking plate mounted the protrusion rod and multiple fins correspondingly aligned with and operationally engaged with the expansion slots when the protrusion rod is wedged into the insertion stub.

Further benefits and advantages of the present invention will become apparent after a careful reading of the detailed description with appropriate reference to the accompanying drawings.

DETAILED DESCRIPTION OF THE PREFERRED EMBODIMENT EMBODIMENTS

A joint with a protrusion rod in accordance with the present invention has a male buckle and a female buckle engaged with each other. The male buckle has a hollow insertion stub with multiple expansion slots and has a receiving hole to movably receive a protrusion rod. A distal end of the protrusion rod is movably engaged with the insertion stub. The protrusion rod has a locking plate and multiple fins correspondingly engaged with the expansion slots when the protrusion rod is wedged into the insertion stub. By having the above structure, difficulty of disengagement of the protrusion rod from the insertion stub is significantly increased to prevent the disengagement of the male buckle and the female buckle. Thus, the joint has increased combination strength and is excellent in utility.

As shown in FIGS. 1 to 8, a preferred embodiment of a joint with a protrusion rod in accordance with the present invention comprises a male buckle 1 and a female buckle 2 engaged with each other. The male buckle 1 has a hollow insertion stub 3 with multiple expansion slots 4 and has a receiving hole (not numbered) to movably receive a protrusion rod 5. A distal end of the protrusion rod 5 is movably engaged to the insertion stub 3. The protrusion rod 5 has a locking plate 6 mounted thereon by a mount and has multiple fins 7 correspondingly aligned with the expansion slots 4. When the protrusion rod 5 is wedged into the insertion stub 3, the multiple fins 7 are engaged with the expansion slots 4 respectively.

Before assembling the parts of the furniture for delivery from factory, a horizontal board part has a first adopting hole at an end, and the male buckle 1 is wedged into the first adopting hole. A vertical supporting part has a second adopting hole at a side, and the female buckle 2 is secured into the second adopting hole. When the parts are assembled, the end of the horizontal board part is placed close to the horizontal supporting part to insert the insertion stub 3 into the female buckle 2. Then, the locking plate 6 is pushed to insert the distal end of the protrusion rod 5 into the insertion stub 3 and to expand the insertion stub 3. Meanwhile, the fins 7 of the protrusion rod 5 insert into the expansion slots 4 respectively to enhance the security of combination of the protrusion rod 5 and the insertion stub 3. Therefore, difficulty of disengagement of the protrusion rod 5 from the insertion stub 3 is significantly increased to prevent the disengagement of the male buckle 1 and the female buckle 2. Thus, the joint has increased combination strength and is excellent in utility.

In the embodiment of this invention, the number of the expansion slots 4 is two, and the number of the fins 7 is the same as the one of the expansion slots 4. The expansion slots 4 are evenly defined around the insertion stub 3. In the preferred embodiment of the present invention, the number of the expansion slots 4 and the fins 7 are four, or selectively two, three or five. When the distal end of the protrusion rod 5 is pushed toward and into the insertion stub 3, the insertion stub 3 is expanded to avoid the insertion stub 3 disengaging from the female buckle 2.

The male buckle 1 in the preferred embodiment has a recess for accommodating the locking plate 6 and its mount. The recess includes a dovetail-shaped recess 8 so that the locking plate 6 is protected from breaking when the locking plate 6 is driven and tilted. The lifespan of the locking plate 6 is increased.

Figure 7:
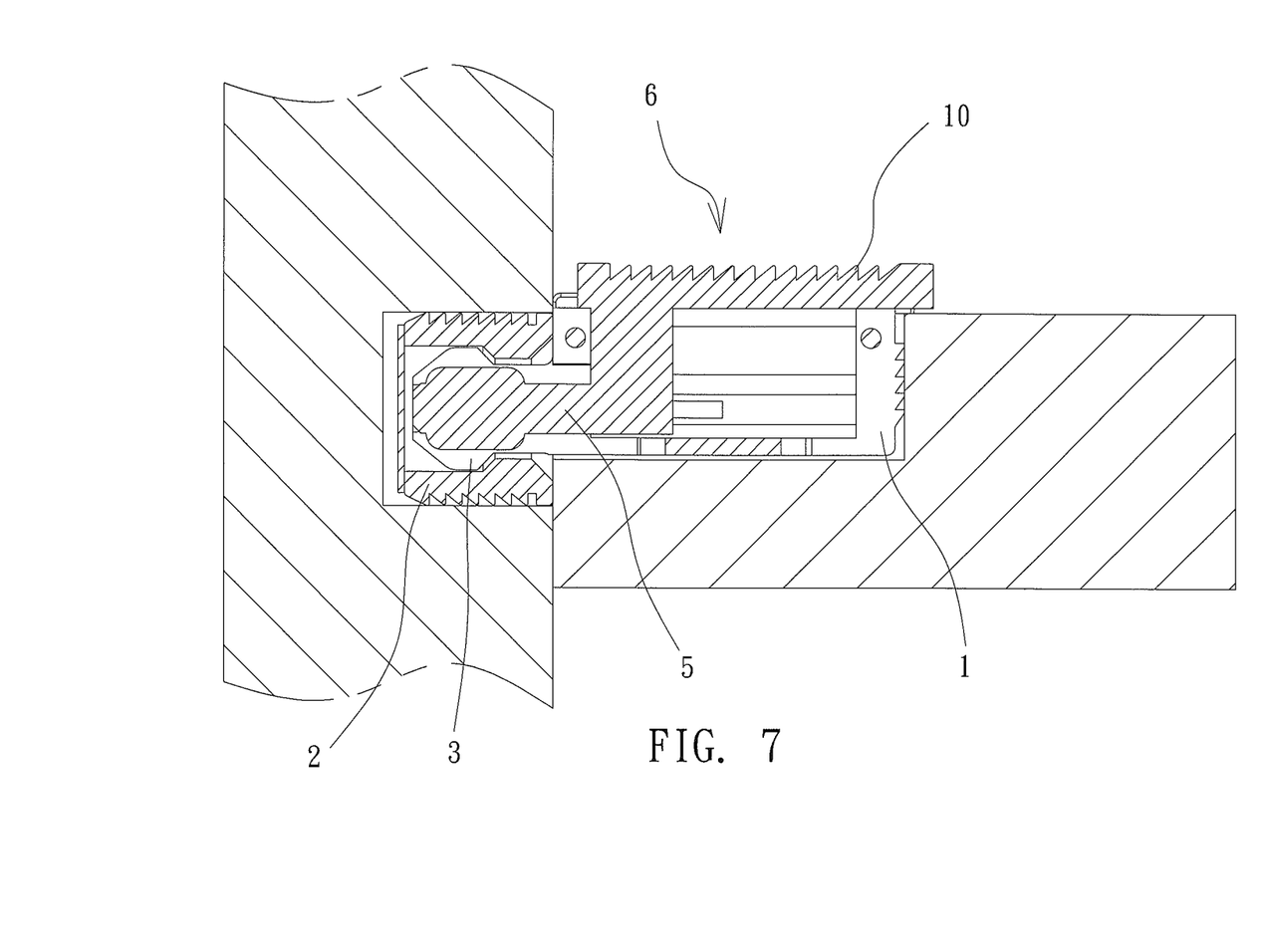
FIG. 7 is a cross-sectional side view of the joint applied to parts of furniture along line A-A in FIG. 6.
Figure 8:
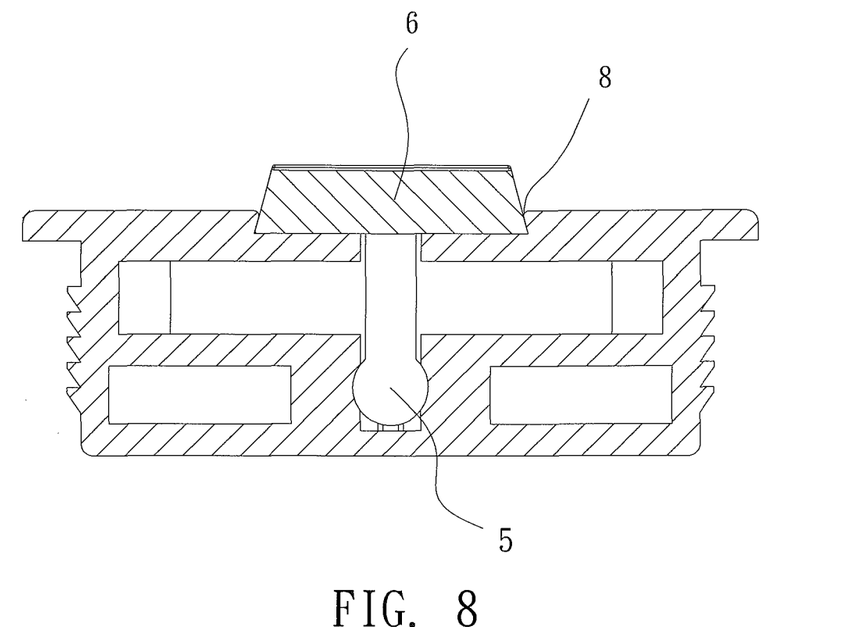
FIG. 8 is a cross-sectional front view of the joint with the protrusion rod along line B-B in FIG. 5.

In the preferred embodiment of the present invention, a front surface of the locking plate 6 is spaced from the front end of the male buckle 1 with a gap when the protrusion rod 5 is accommodated in the receiving hole of the male buckle 1, and the distal end of the protrusion rod 5 is wedged into the insertion stub 3 (as shown in FIG. 7). When the protrusion rod 5 is pushed backward into the receiving hole of the male buckle 1, a flat screwdriver is inserted into the gap to push the locking plate 6 to drive the protrusion rod 5 backward to the receiving hole.

In the preferred embodiment of the present invention, a rear end of the locking plate extends out of the recess when the protrusion rod 5 is pushed backward to the receiving hole. When the locking plate 6 is pushed to wedge the protrusion rod 5 into the insertion stub 3, the rear end of the locking plate 6 is pushed inward without obstruction of the sidewall of the male buckle 1 so that assembly of the joint is easy and quick and has excellent utility.

In the preferred embodiment of the present invention, the locking plate 6 has multiple anti-slip grooves 10 which facilitate the pushing of the locking plate 6 when the friction between the protrusion rod 5 and the insertion stub 3 is small.

Figure 1:
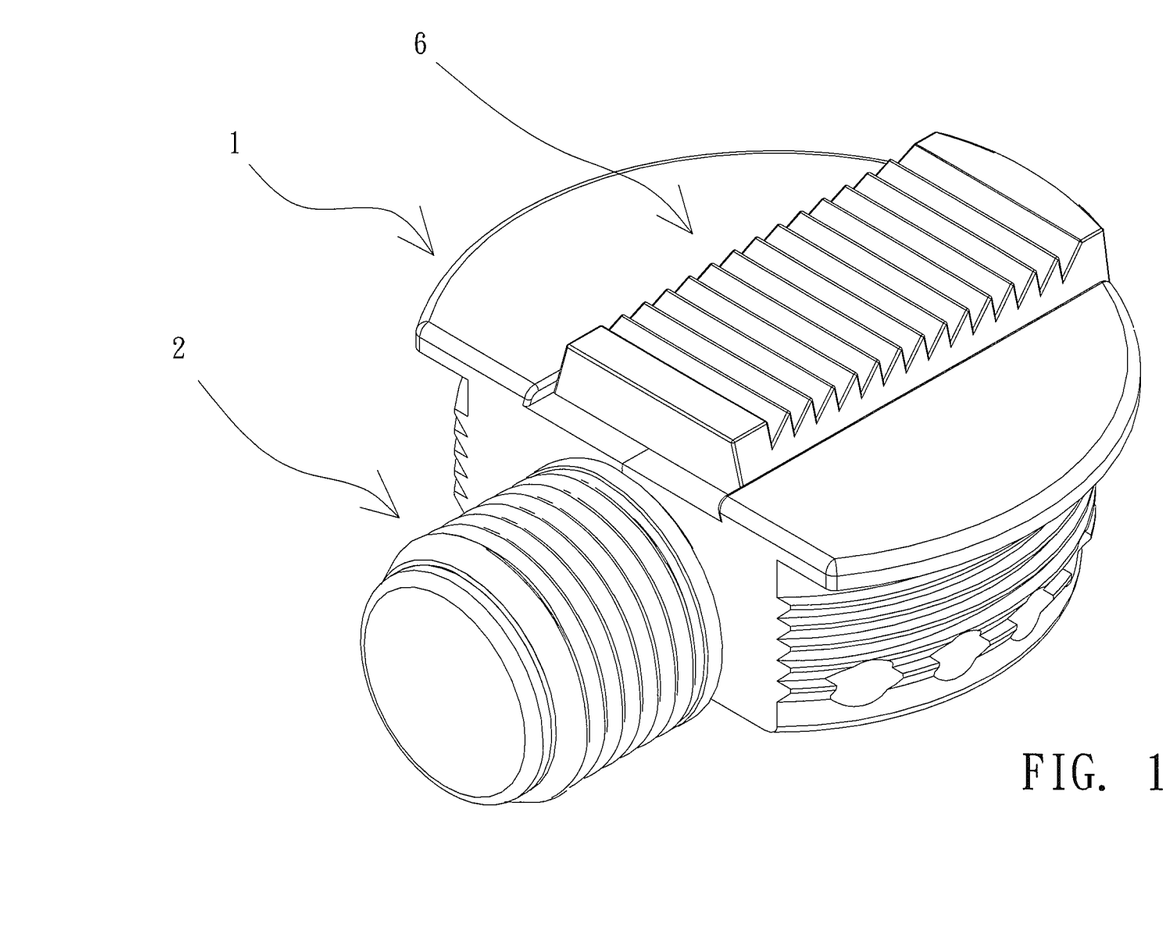
FIG. 1 is a perspective view of a joint with a protrusion rod in accordance with the present invention.
Figure 2:
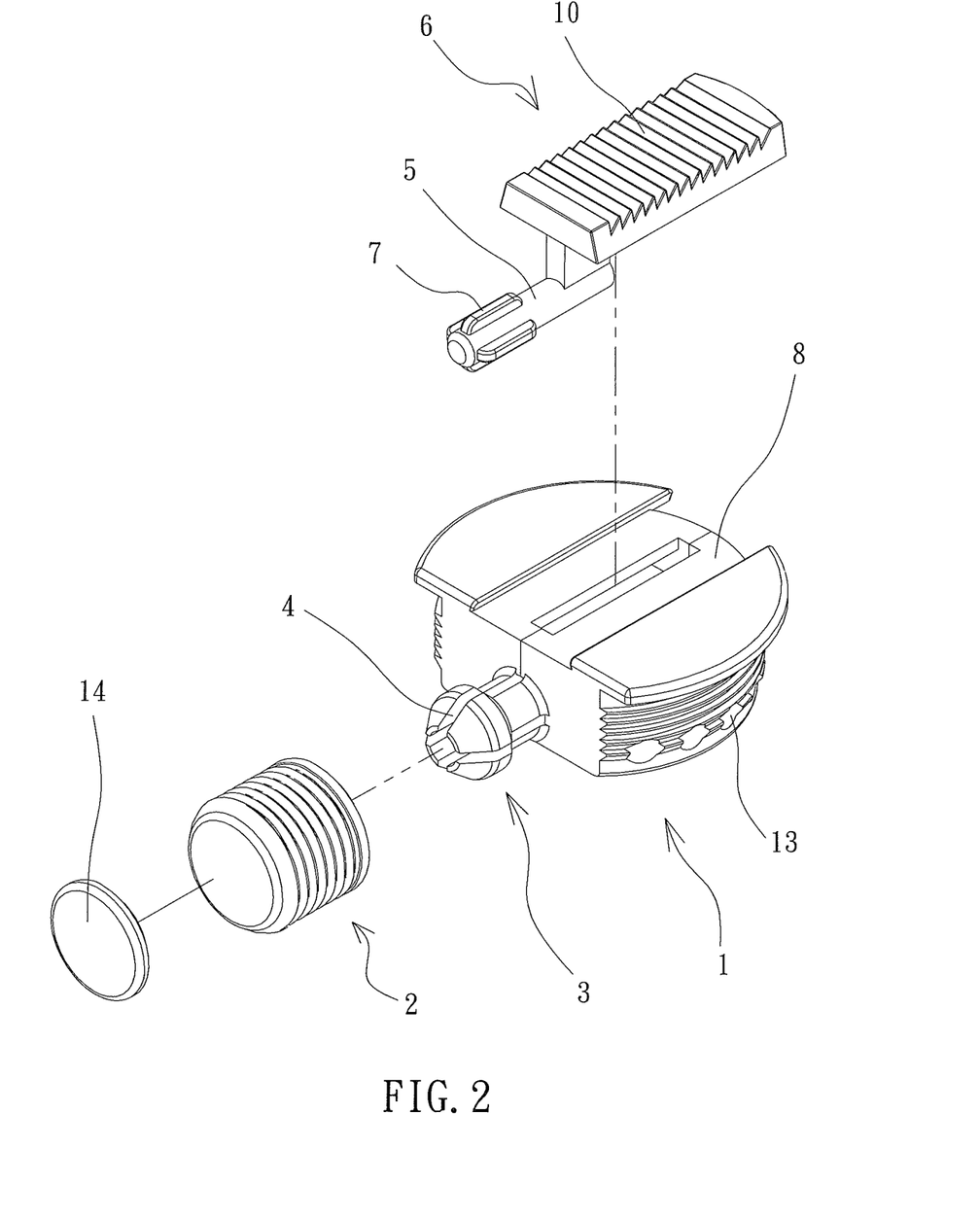
FIG. 2 is an exploded perspective view of the joint with the protrusion rod in FIG. 1.
Figure 3:
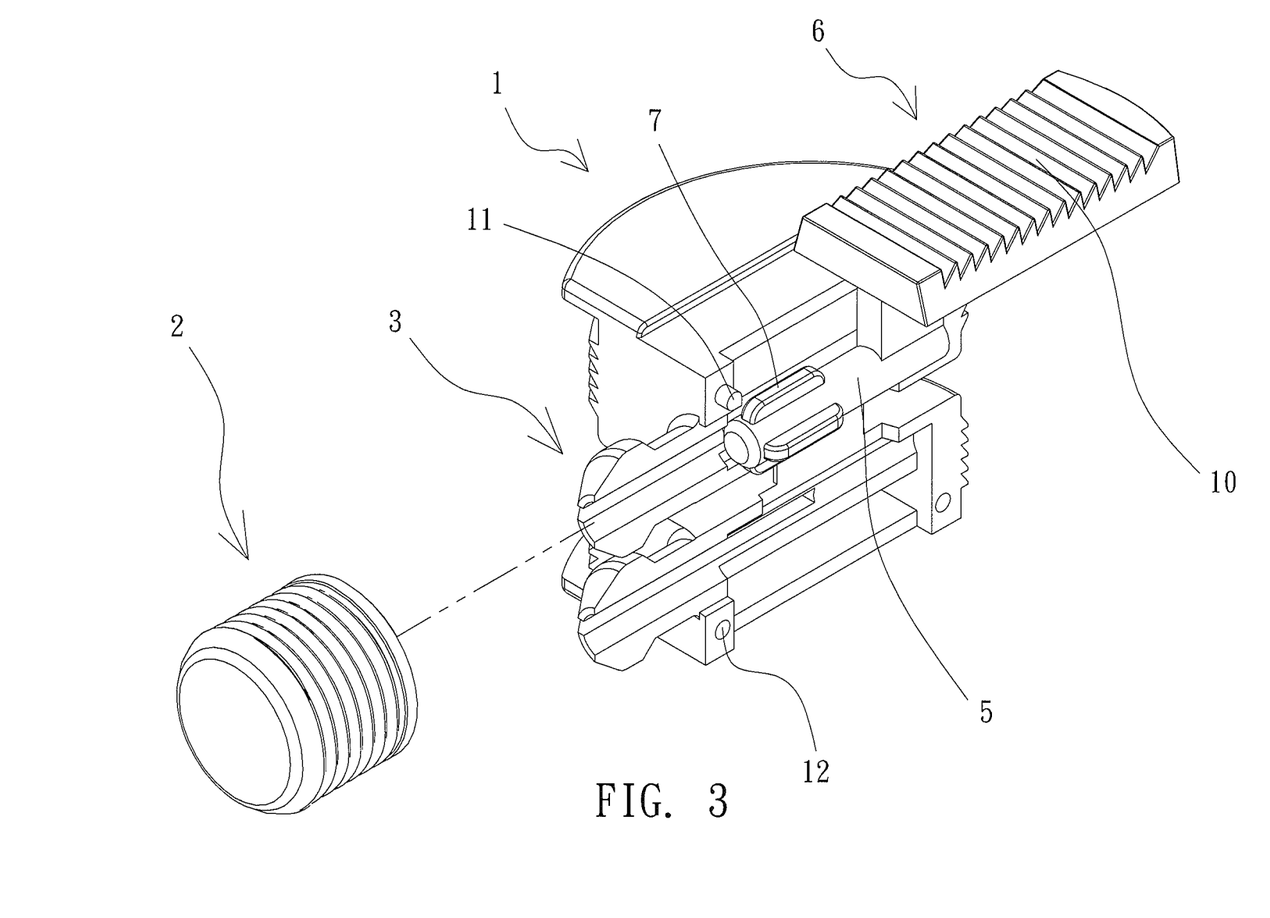
FIG. 3 is a partially cross-sectional perspective view of the joint with the protrusion rod in FIG. 1.
Figure 4:
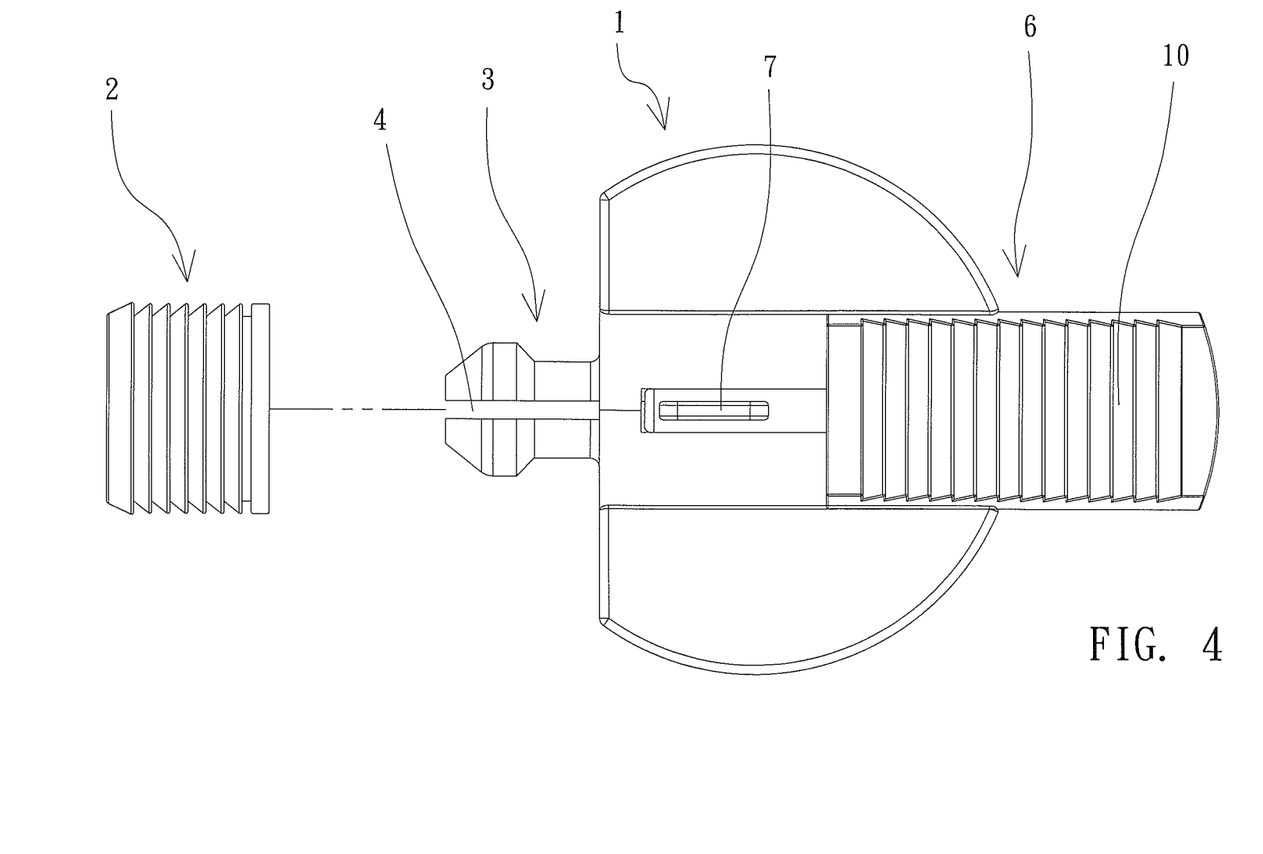
FIG. 4 is a top plan view of the joint with the protrusion rod in FIG. 3 with the joint disengaged.
Figure 5:
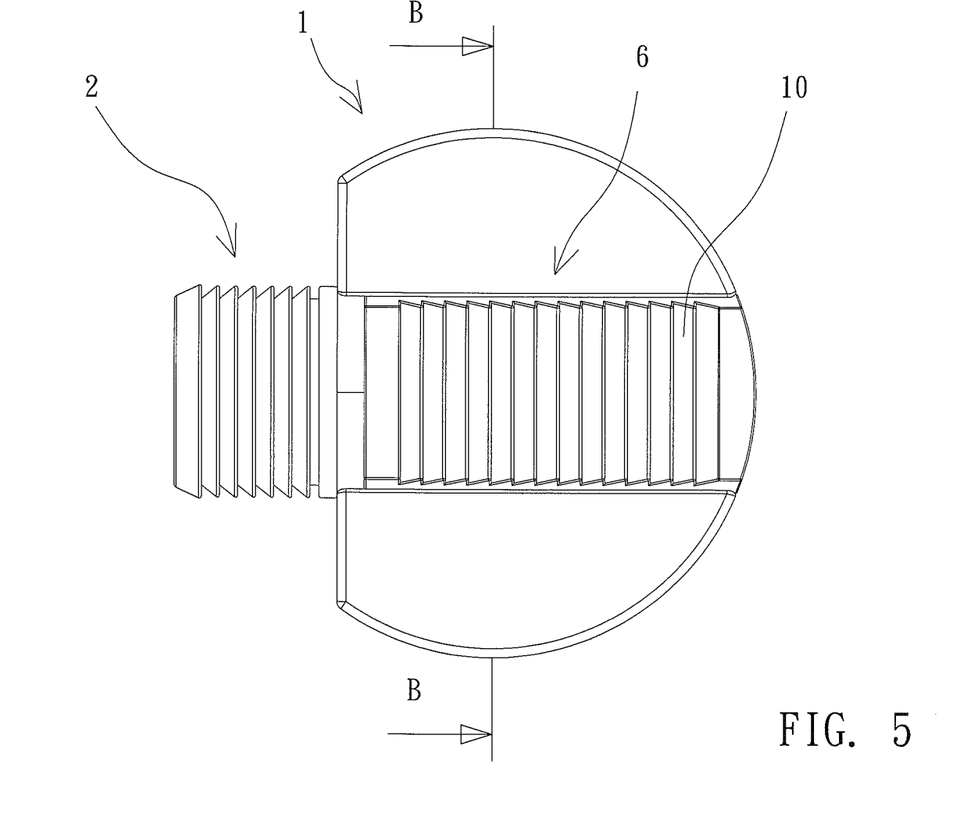
FIG. 5 is a top plan view of the joint with the protrusion rod with the joint engaged.
Figure 6:
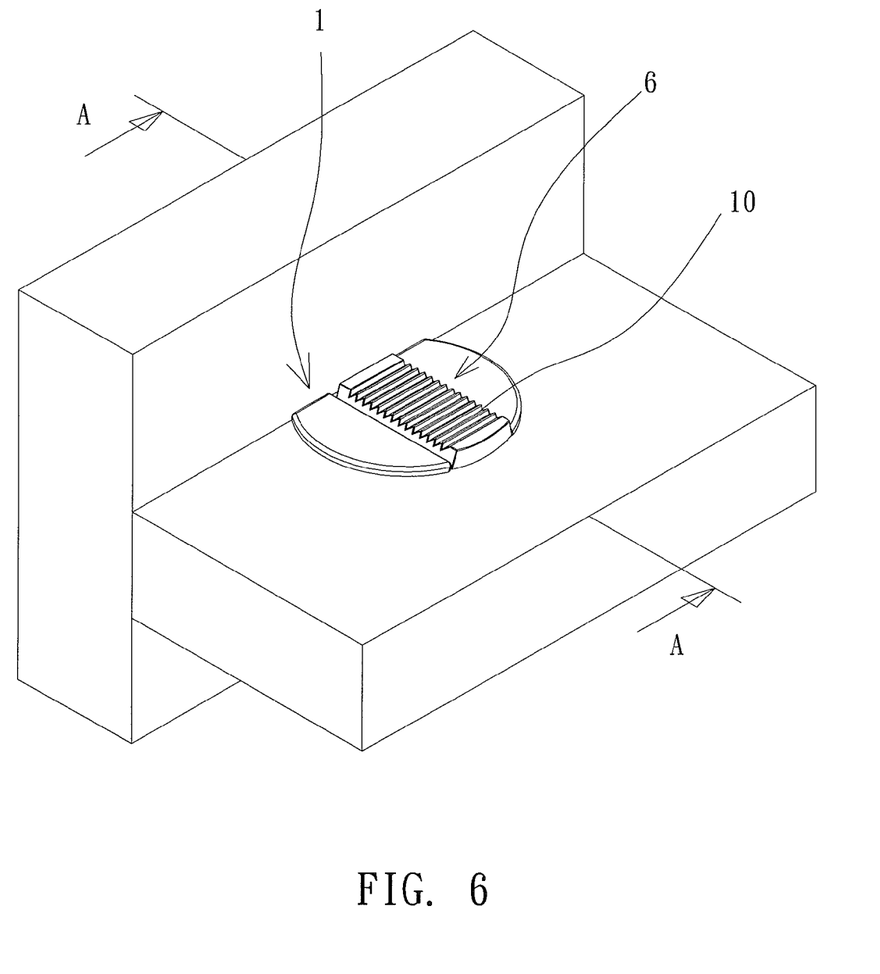
FIG. 6 is an operational perspective view of the joint applied to parts of furniture.

As shown in FIG. 3, in the preferred embodiment of the present invention, the male buckle 1 is composed of two semi-bodies. One of the semi-bodies has a tenon 11, and the other semi-body has a corresponding mortise 12 to engage the tenon 11 with the mortise 12. When the male buckle 1 is assembled, the protrusion rod 5 is placed in the receiving hole of one semi-body. Then, the other semi-body is driven to close to wedge the tenon 11 into the mortise 12. Thereby, the male buckle 1 is quickly assembled.

Moreover, the male buckle 1 and the female buckle 2 have multiple annular stops defined on an outer periphery. Therefore, the male buckle 1 and the female buckle 2 have a strong combination with the parts of the furniture when wedged into the first adopting hole and the second adopting hole to increase the excellent stability of the joint in combination with the parts of the furniture.

The periphery of the male buckle 1 further has multiple dimples 13 for accommodating glue. When the first adopting hole is filled with glue, the dimples 13 keep the glue inside the first adopting hole to improve the adhesive efficiency of the glue.

In the preferred embodiment of this invention, the female buckle 2 has a cover 14 mounted to a rear end thereof to avoid wood flour or glue entering the female buckle 2, which might affect the operation of the female buckle 2.

Figure 9:
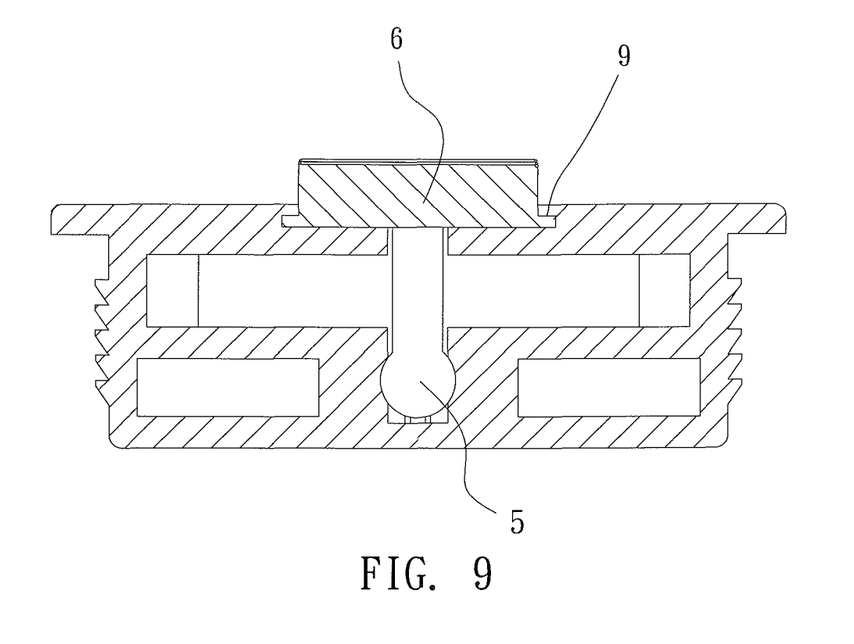
FIG. 9 is a cross-sectional front view of one embodiment of the joint in accordance with the present invention.

As shown in FIG. 9, another preferred embodiment of the joint in the present invention has the same configuration with the forgoing one except the recess of the male buckle 1 for receiving the locking plate 6 is of an inverted T-shape to fit an inverted T-shaped recess 9.

Although this invention has been described in its preferred forms with a certain degree of particularity, it is understood that the present invention of the preferred forms has been made only by way of example, and that numerous changes in the details of construction and the combination and arrangement of parts may be resorted to without departing from the spirit and scope of the invention.

What is claimed is:

1. A joint comprising:
   a male buckle and a female buckle engaged with each other, wherein the male buckle has a hollow insertion stub with multiple expansion slots and has a receiving hole and a mount recess communicating with the receiving hole;
   a protrusion rod movably received inside the receiving hole of the male buckle and having multiple fins correspondingly aligned with and operationally engaged with the expansion slots when the protrusion rod is wedged into the insertion stub; and
   a locking plate mounted to the protrusion rod by a mount, with the mount slideably received in the mount recess for slideable movement parallel to the receiving hole and the protrusion rod, with the locking plate being parallel to and spaced from the protrusion rod.

2. The joint as claimed in claim 1, wherein the number of the expansion slots is at least two and the number of the fins is the same as the number of the expansion slots; and
   wherein the expansion slots are evenly defined around the insertion stub.

3. The joint as claimed in claim 1, wherein the male buckle has a plate recess parallel to and spaced from the receiving hole to accommodate the locking plate and intersecting the mount recess; and
   wherein the plate recess is in a shape of a dovetail recess perpendicular to the slideable movement.

4. The joint as claimed in claim 3, wherein a front surface of the locking plate is spaced from a front end of the male buckle with a gap located in the plate recess when the protrusion rod is accommodated in the receiving hole of the male buckle and the protrusion rod is wedged into the insertion stub.

5. The joint as claimed in claim 3, wherein a rear end of the locking plate extends out of the plate recess when the protrusion rod is pushed backward to the receiving hole.

6. The joint as claimed in claim 1, wherein the male buckle has a plate recess parallel to and spaced from the receiving hole to accommodate the locking plate and intersecting the mount recess; and
   wherein the plate recess is in a shape of an inverted T-shaped recess perpendicular to the slideable movement.

7. The joint as claimed in claim 6, wherein a front surface of the locking plate is spaced from a front end of the male buckle with a gap located in the plate recess when the protrusion rod is accommodated in the receiving hole of the male buckle and the protrusion rod is wedged into the insertion stub.

8. The joint as claimed in claim 6, wherein a rear end of the locking plate extends out of the plate recess when the protrusion rod is pushed backward to the receiving hole.

9. The joint as claimed in claim 1, wherein the locking plate has multiple anti-slip grooves.

10. The joint as claimed in claim 1, wherein the male buckle is composed of two semi-bodies; and wherein one of the two semi-bodies has a tenon and another of the two semi-bodies has a corresponding mortise to make the tenon engaged with the mortise.

11. The joint as claimed in claim 1, wherein the male buckle and the female buckle have multiple annular stops defined on an outer periphery respectively.

12. The joint as claimed in claim 1, wherein a periphery of the male buckle has multiple dimples for accommodating glue.

13. The joint as claimed in claim 1, wherein the female buckle has a cover mounted to a rear end of the female buckle.

* * * * *